United States Patent [19]

Fujitani et al.

[11] Patent Number: 4,898,259
[45] Date of Patent: Feb. 6, 1990

[54] FOUR-WHEEL DRIVE APPARATUS FOR AUTOMOTIVE VEHICLES

[75] Inventors: Yuuki Fujitani, Toyota; Kouji Kawakami, Ciryu, both of Japan

[73] Assignee: Aisin Seiki Kabushiki Kaisha, Kariya, Japan

[21] Appl. No.: 174,817

[22] Filed: Mar. 29, 1988

[30] Foreign Application Priority Data

Mar. 31, 1987 [JP] Japan .................................. 62-76401
Mar. 31, 1987 [JP] Japan .................................. 62-76402
Mar. 31, 1987 [JP] Japan .................................. 62-76403

[51] Int. Cl.$^4$ .......................................... B60K 17/352
[52] U.S. Cl. ................................. 180/250; 74/665 G
[58] Field of Search ............... 180/248, 247, 249, 250, 180/233; 74/665 GA, 665 GE, 665 GB, 447, 665 G

[56] References Cited

U.S. PATENT DOCUMENTS 4,678,055  7/1967  Yoshinka et al. ................... 180/248

FOREIGN PATENT DOCUMENTS 0081226  5/1984  Japan .................................. 180/248
0232925  10/1988  Japan .................................. 180/248

Primary Examiner—Charles A. Marmor
Assistant Examiner—Richard Camby
Attorney, Agent, or Firm—Burns, Doane, Swecker & Mathis

[57] ABSTRACT

A full-time four-wheel drive apparatus for an automotive vehicle includes a planetary gear unit for shifting purposes, a shift changeover unit, a differential unit and a transfer unit for transferring rotating power from the rear-wheel side to the front-wheel side or vice versa. The shift changeover unit is arranged on the side of said planetary gear unit directed to the input shaft of the four-wheel drive apparatus, the carrier of the planetary gear unit is connected to the output shaft of the four-wheel drive apparatus, the differential unit is arranged between the planetary gear unit and the transfer unit, and a rotating force outputted by the planetary gear unit is transferred to the rear-wheel side and front-wheel side. Fluxure force exerted on a main shaft caused by the transfer unit based on a chain is eliminated and axial length of the apparatus is reduced.

13 Claims, 9 Drawing Sheets

FOUR-WHEEL DRIVE APPARATUS FOR AUTOMOTIVE VEHICLES

BACKGROUND

This invention relates to a four-wheel drive apparatus for automotive vehicles and, more particularly, to the arrangement of a changeover mechanism in the transmission section of such a four-wheel drive apparatus.

As shown in FIG. 1, a four-wheel drive system for an automotive vehicle generally includes a four-wheel drive apparatus 3 by which a rotating torque transmitted from an engine 1 via a transmission 2 is distributed to a rear-wheel differential 4 and front-wheel differential 5 to rotate rear-wheels 6 and front-wheels 7.

First Aspect

If the conventional four-wheel drive apparatus 3 is for full-time four-wheel drive, as shown in FIG. 2, the arrangement of the apparatus is such that the rotational force applied to an input shaft 11 from the transmission is transferred to a main output shaft via a shift sleeve 12A of a shift changeover unit 12 when the sleeve 12A slides leftward in the Figure to mesh a gear 12B and a gear 11A. The force transferred to the main output shaft 13 is transmitted via a differential 21 to a rear-wheel output shaft 14 to rotate the rear wheels.

The rotating force of the main output shaft 13 is transmitted from the differential 21 to a front-wheel output shaft 15 via a drive sprocket 16, chain 17 and follower sprocket 18 to rotate the front wheels.

When, with the system in the regular four-wheel drive state (4H), the shift sleeve 12A is slid rightward in the Figure to take the gear 12B out of mesh with the gear 11A and mesh it with a gear 19A, the rotating force of the input shaft 11 is transmitted to the main output shaft 13 via a planetary sun gear 19B and planetary carrier 19C of a planetary gear set 19, and the shift sleeve 12A. Since a planetary ring gear 19D is being locked at this state, the planetary carrier C is decelerated to establish four-wheel low-speed drive (4L).

When the gear 12B of the shift sleeve 12A is meshing with neither gear 11A nor gear 19A, this represents the neutral state.

The arrangement of FIG. 2 includes a changeover sleeve 22 for locking and unlocking the differential. FIG. 2 illustrates a case where the differential 21 is a bevel differential. FIG. 4, on the other hand, shows a case where use is made of a differential 21' comprising a planetary differential.

Second and Third Aspects

If the conventional four-wheel drive apparatus 3 is for part-time four-wheel drive, as shown in FIGS. 5 and 6, the arrangement (its synchronizer mechanism of a planetary transmission mechanism) of the apparatus is such that, at a two-wheel drive mode, the rotating force applied to the input shaft 11 from the transmission is transferred to a rear-wheel output shaft 13' via the shift sleeve 12A when the sleeve 12A slides leftward in the Figure to mesh the gear 12B and the gear 11A of the input shaft 11 aided by a synchronizer 25. Since a sleeve 24A of a 2–4 changeover unit 24 is at its rightward position in FIG. 5 so that a gear 13'A is not in mesh with a gear 24B, rotating force is not transmitted to the front-wheel output shaft 15.

When the 2–4 changeover sleeve 24A is slid leftward in FIG. 5 in the two-wheel drive state, the gear 13A is meshed with the gear 24B via the sleeve 24A, so that the rotating force of the rear-wheel output shaft 13' is transmitted to the front-wheel output shaft 15 via a drive sprocket 16', chain 17 and follower sprocket 18 to establish a regular four-wheel drive mode (4H).

When, with the system in the regular four-wheel drive mode (4H), the shift sleeve 12A is slid rightward in the Figure to mesh the gear 12B' with the gear 19A of the planetary carrier 19C, the rotating force of the input shaft 11 is transmitted to the rear-wheel output shaft 13' via the planetary sun gear 19B and planetary carrier 19C of the planetary gear set 19, and the shift sleeve 12A, as in the case with full-time four-wheel drive apparatus of FIG. 2. Since the planetary ring gear 19D will be locked at this time, the planetary carrier C is decelerated to establish the four-wheel low-speed drive mode (4L).

When the gear 12B of the shift sleeve 12A is meshing with neither gear 11A nor gear 19A, this represents the neutral state.

SUMMARY OF THE DISCLOSURE

Discussion of the drawbacks in the Prior Art is first made as follows.

With the conventional full-time four-wheel drive apparatus indicated in the first aspect, it will be apparent from FIG. 2 or FIG. 4 that the differential 21 or 21' is arranged between the drive sprocket 16, which transfers power from the main output shaft 13 to the front-wheel output shaft 15, and a bearing 23 rotatably supporting the rear-wheel output shaft 14. Consequently, length along the axis is increased. In addition, the drive sprocket 16 and chain 17 and arranged away from the center of the main output shaft 13. Therefore, since a tensioning force T' produced by the chain 17 pulls an intermediate portion of the shaft 13 away from the center axis, the shaft undergoes a large amount of flexure, as a result of which the gears may not mesh properly and service life is curtailed.

With the conventional part-time four-wheel drive apparatus of FIGS. 5 and 6 in the SECOND aspect, the shift changeover unit 12 is arranged between the planetary gear set 19 and the 2–4 changeover unit 24, and the shift sleeve 12A having the synchronizer 25 slides between the gear 19A, which is formed on the end of an extension 19A' of the planetary carrier 19C, and splines of the input shaft 11 and output shaft 13'. Furthermore, the synchronizer mechanism is arranged for high-speed changeover. Consequently, the diameter of the synchronizer 25 is limited by the shaft diameters of the input shaft 11 and output shaft 13' and the carrier diameter of the planetary carrier 19C. Accordingly, the synchronizer has very little degree of freedom in the diametric direction. Thus, a disadvantage of the prior art in the second aspect is that synchronizer capacity cannot be changed with ease.

With the conventional part-time four-wheel drive apparatus of FIG. 5 in the THIRD aspect, the shift changeover unit 12 is arranged between the planetary gear set 19 and the 2–4 changeover unit 24. As a result, the carrier 19C is extended over a considerable length in the rearward direction, namely on the rear-wheel side, and therefore assumes a cantilever-like state of great instability. In order to support the carrier 19C in this cantilever fashion, the structure is such that the carrier 15C is supported by a casing 20 forwardly of the planetary gear set 19, namely on the front-wheel side, and the bearing structure for rotatably supporting the input shaft 11, rear-wheel output shaft 13' and carrier 19C at the support point has the three-layer structure as illustrated in the FIGS. 2 and 5. Such a structure is very complicated. Further, owing to the need for sufficient space for the bearing, the diameter of the input shaft 11 and that of the output shaft 13 cannot be made large (or thick) enough. The result is a problem in terms of mechanical strength.

The present invention places its primary purpose on to solve the aforementioned problems possessed by the conventional four-wheel drive apparatus described above.

Specifically, an object according to a FIRST aspect of the invention is to provide a full-time four-wheel drive apparatus in which the length along the axis of the apparatus is reduced to afford a more compact apparatus, and in which shaft flexure is prevented so that drive can be performed smoothly.

An object according to a SECOND aspect of the invention is to provide a shift synchronizer mechanism for a four-wheel drive apparatus in which there is a large degree of freedom for changing synchronizer capacity.

An object according to a THIRD aspect of the invention is to provide a shift changeover mechanism for a four-wheel drive apparatus in which the structure is simplified and a stable changeover operation can be performed by eliminating the cantilever-like support of the planetary carrier.

According to the present invention, the object of the FIRST aspect is attained by providing a full-time four-wheel drive apparatus comprising a planetary gear unit for shifting, a shift changeover unit, a differential unit and a transfer unit for transferring rotating power from one of a rear-wheel side and a front-wheel side to the other, wherein the shift changeover unit is arranged on a side of the planetary gear unit directed to an input shaft of the four-wheel drive apparatus, a carrier of the planetary gear unit is connected to an output shaft, the differential unit is arranged between the planetary gear unit and the transfer unit, and a rotating force outputted by the planetary gear unit is transferred to the rear-wheel side and front-wheel side.

The shift changeover unit may be of a type changed over by sliding a sleeve, or of a type changed over by the on/off action of a pair of multiple-disk clutches.

The differential unit may comprise a double pinion-type planetary gear unit, in which case a differential planetary ring gear of the differential unit is connected to a shift planetary gear of the planetary gear unit for shifting, with rotating force being inputted from the planetary gear unit for shifting.

When the shift changeover unit is changed over to the high-speed side in the above-described full-time four-wheel drive apparatus of the inventive FIRST aspect, the rotating force of the input shaft is transferred directly to the output shaft via the shift changeover unit to establish an ordinary four-wheel drive mode (4H).

When the shift changeover unit is changed over to the low-speed side, rotating force from the input shaft is transferred to the sun gear of the planetary gear unit via the changeover unit and from the carrier to the output shaft to establish a four-wheel low-speed drive mode (4L).

Rotating force inputted to the differential unit from the planetary gear unit for shifting is distributed in the differential unit to the rear-wheel drive side and front-wheel drive side. The rotating force applied to one drive side (e.g. the rear-wheel drive side) is transmitted directly to the output shaft, and the rotating force applied to the other side (e.g. the front-wheel side) is transmitted to the output shaft via the transfer unit (e.g. a drive sprocket, a follower sprocket and a chain linking the two sprockets).

In accordance with the inventive FIRST aspect, the shift changeover unit disposed rearwardly (on the output side) of the shifting planetary gears in the prior-art arrangement is now arranged forwardly (on the input side) of the planetary gears. Furthermore, the differential unit disposed rearwardly of the transfer unit for transfer of rotating force between the rear-wheel drive side and front-wheel drive side in the prior art is now arranged between the shifting planetary gear unit and the transfer unit in accordance with the present inventive aspect. Accordingly, it can be arranged so that the shifting planetary gear unit and the transfer unit have portions in common, thereby making it possible to reduce the axial length of the drive apparatus correspondingly. In addition, the transfer unit can be disposed in close proximity to the bearing section. This makes it possible to diminish the shaft flexure when rotating force is transferred. As a result, operation of the drive apparatus is smoothened and the service life of the apparatus is prolonged.

According to the present invention, the object of the SECOND aspect is attained by providing a four-wheel drive apparatus comprising a speed-reducing planetary gear unit and a shift changeover unit equipped with a synchronizer mechanism for changeover to a high-speed side, wherein the shift changeover unit is arranged on a side (area) of the planetary gear unit directed to an input shaft of the four-wheel drive apparatus, a carrier of the planetary gear unit is connected to an output shaft, and by changing over the shift changeover unit, rotating force from the input shaft is transferred to the output shaft via the synchronizer mechanism or rotating force is transferred from the carrier to the output shaft via the planetary gear unit.

The synchronizer mechanism is arranged between a shift sleeve and the output shaft in a case where the shift changeover unit is of the so-called Warner type, or between a pin, which is attached to a shift sleeve, and a planetary carrier in a case where the shift changeover unit is of the so-called pin type.

In the above-described synchronizer mechanism, the input shaft is connected directory to the output shaft by the synchronizer mechanism of the shift changeover unit when the shift changeover unit is changed over to the high-speed side to establish a two-wheel drive mode (2H) or, by the switching action of a 2-4 changeover unit, the ordinary four-wheel drive mode (4H).

When the shift changeover unit is changed over to the low-speed side, rotating force from the input shaft is transmitted to the sun gear of the planetary gear unit via the changeover unit and from the carrier to the output shaft to establish the four-wheel low-speed drive mode (4L).

In the SECOND aspect of the invention, the synchronizer mechanism for changeover to the high-speed side is arranged in the shift changeover unit disposed forwardly of the planetary gear unit for effecting a changeover before the rotating force from the input shaft is inputted to the planetary gear unit. As a result, the limitation imposed upon the setting of the synchronizer diameter by the diameter of the carrier in the planetary gear unit and the shaft diameter of the output shaft is much less in comparison with the prior art. Accordingly, there is a greater degree of freedom with regard to changing the synchronizer capacity and a wider variety of main transmissions which can be installed.

According to the present invention, the object of the THIRD aspect is attained by providing a four-wheel drive apparatus comprising a speed-reducing planetary gear unit (a planetary gear set) and a shift changeover unit, wherein the shift changeover unit is arranged on a side (area) of the planetary gear unit directed to input shaft of the four-wheel drive apparatus, a carrier of the planetary gear unit is connected to an output shaft, and by changing over the shift changeover unit, rotating force from the input shaft is transferred directly to the output shaft or rotating force is transferred via the planetary gear unit from its carrier to the output shaft.

In the above-described arrangement, the shift changeover unit is arranged forwardly (on the input shaft side) of the planetary gear unit, and the carrier is connected directly to the output shaft. Accordingly, a two-layer bearing structure is formed between the input shaft and output shaft, (i.e., the three-layered bearing structure is eliminated). In addition, the sun gear of the planetary gear unit can be constructed separately of the input shaft and output shaft.

In the above arrangement, the sun gear of the planetary gear unit may be formed separately from any one of the input shaft or the output shaft.

In the above-described changeover mechanism, the rotating force of the input shaft is transferred directly to the output shaft via the shift changeover unit when the shift changeover unit is changed over to the high-speed side to establish the two-wheel drive mode (2H), by the switching action of a 2-4 changeover unit, the ordinary four-wheel drive mode (4H).

When the shift changeover unit is changed over to the low-speed side, the rotating force from the input shaft is transmitted to the sun gear of the planetary gear unit via the changeover unit, i.e., from the carrier to the output shaft to establish the four-wheel low-speed drive mode (4L).

Further, by constructing the sun gear separately of the input shaft and output shaft, a state in which the sun gear races in a range other than that for the four-wheel low-speed drive mode (4L) can be avoided.

In the third aspect of the invention, the shift changeover unit of the four-wheel drive apparatus is arranged forwardly (on the front-wheel side) of the planetary gear unit, and a shift changeover is performed before the rotating force from the input shaft is inputted to the planetary gear unit. Consequently, the transmitted torque in the shift changeover unit has the same torque capacity on the high-speed and low-speed side, so that it is no longer necessary to employ a large-size changeover unit as in the prior art due to an increase in torque by an amount corresponding to the deceleration ratio in the planetary gear unit on the low-speed side. As result, the invention makes it possible to reduce the size of the four-wheel drive apparatus.

Furthermore, in the third aspect, since the carrier of the planetary gear unit is directly supported by the output shaft, the bearing section of the input shaft and output shaft can be reduced from the conventional three-layer structure to a two-layer structure, thereby allowing simplification of the overall structure. In addition, since the diameters of the input and output shafts can be made sufficiently large, a satisfactory mechanical strength is assured.

SUMMARY OF THE PREFERRED EMBODIMENTS

In the FIRST aspect of the invention, the shift changeover unit includes a shift sleeve meshing at all times with a gear integral with the input shaft, the shift sleeve being meshed with a gear integral with the output shaft or a gear integral with a sun gear of the planetary gear unit when slid in the axial direction. The shift sleeve is capable of assuming a neutral position in which it meshes with neither the gear integral with the output shaft nor the gear integral with the sun gear of the planetary gear unit. The shift changeover unit is changed over to a high-speed side when the shift sleeve is meshed with the gear integral with the output shaft, and to a low-speed side when the shift sleeve is meshed with the gear integral with the sun gear of the planetary gear unit.

The sun gear of the planetary gear unit is integrally coupled with the input shaft, and the shift changeover unit includes a first clutch attached between the input shaft and the planetary carrier of the planetary gear unit, and a second clutch attached between a casing of the apparatus and a ring gear of the planetary gear unit. The first and second clutches each comprise a multiple-disk clutch. The shift changeover unit is changed over to the high-speed side when the first clutch is engaged and the second clutch is disengaged, and to the low-speed side when the first clutch is disengaged and the second clutch is engaged.

The differential unit comprises a double pinion-type planetary gear unit having a differential planetary ring gear coupled with the planetary carrier of the planetary gear unit for shifting so as to rotate in unison therewith. The planetary carrier of the differential unit is coupled with the transfer unit, and the differential unit includes a differential lock/unlock changeover sleeve for coupling the planetary carrier and the planetary ring gear in such a manner that the planetary carrier and planetary ring gear rotate in unison.

In the SECOND aspect of the invention, the shift changeover unit includes a shift sleeve meshing at all times with a gear integral with input shaft, the shift sleeve being meshed with a gear integral with the output shaft or a gear integral with a sun gear of the planetary gear unit when slid in an axial direction.

The synchronizer mechanism of the shift changeover unit is arranged between the shift sleeve and the output shaft. In another embodiment, the synchronizer mechanism of the shift changeover unit is arranged between the shift sleeve and the planetary carrier of the planetary gear unit.

In the third aspect of the invention, the input shift is freely rotatably supported on a casing by a first bearing, and an end portion of the output shaft is freely rotatably supported in a hollow portion of the input shaft by a second bearing.

The sun gear of the planetary gear unit is arranged separately of the input shaft and output shaft.

DETAILED DESCRIPTION OF THE PREFERRED EMBODIMENTS

Embodiments of the present invention will now be described in detail with reference to the drawings.

Figure 7:
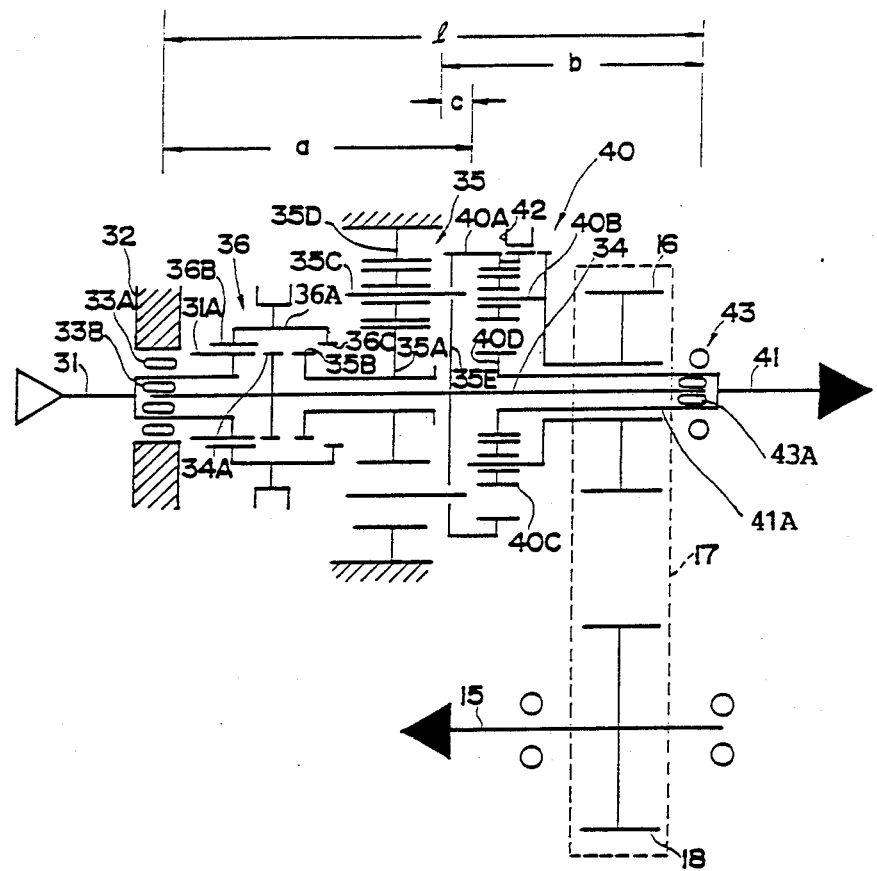
FIG. 7 is a skeleton view illustrating an embodiment of a full-time four-wheel drive apparatus according to the present invention (first aspects)

As shown in FIG. 7, a full-time four-wheel drive apparatus according to the present invention includes an input shaft 31 freely rotatably supported on a casing 32 by a bearing 33A. The front end (left in FIG. 7 i.e., the end on the front-wheel side) of a main output shaft 34 is freely rotatably supported in a hollow portion of the input shaft 31 by a bearing 33B.

A shift changeover unit 36 having a shift sleeve 36A is arranged between the area where the main output shaft 34 is supported on the input shaft 31 and a planetary gear set 35. When the shift sleeve 36A is slid rightward in FIG. 7 from a neutral state, which is the state illustrated, a gear 31A of the input shaft 31 and a gear 34A of the main output shaft 34 are coupled via a gear 36B of the sleeve 36A. When the shift sleeve 36A is slid leftward in FIG. 7 from the neutral state, a gear 36C of the sleeve 36A is meshed with a gear 35B integral with a planetary sun gear 35A, the gear 36B being continuously in mesh with the gear 31 A, whereby the input shaft 31 and planetary sun gear 35A are coupled via the sleeve 36A.

A shift planetary carrier 35C is coupled directly to the main output shaft 34, so that the rotating force of the planetary sun gear 35A is transferred to the main output shaft 34 via a connecting member 35E.

A double pinion-type differential unit 40 is disposed rearwardly (on the rear-wheel side) of the planetary gear set 35 and includes a differential planetary ring gear 40A coupled directly to the shift planetary carrier 35C. Rotating force from the shift planetary carrier 35C is transferred to a differential planetary sun gear 40D via the differential planetary gear 40A, a differential planetary carrier 40B and a differential planetary sun gear 40D, and the rotating force is transferred from the differential planetary sun gear 40D to a rear-wheel output shaft 41 to rotate the rear wheels.

Also, the differential planetary carrier 40B is connected to a drive sprocket 16, so that the rotating force from the differential planetary carrier 40B is transferred to the drive sprocket 16 and thence to a front-wheel output shaft 15 via the chain 17 and a follower sprocket 18 to rotate the front wheels.

The drive sprocket 16 is rotatably supported on the outer periphery of a hollow shaft portion 41A of the rear-wheel output shaft 41. The main output shaft 34 extends throughout the centers of the shift change over unit 36, the shift (reduction) planetary gear set 35, the differential planetary ear set 40, the drive sprocket 16 until the rear end (right in FIG. 7) of the apparatus.

At the rear end, the main shaft 34 is rotatably supported on (and within) the hollow shaft portion 41A by means of a bearing 43A, the hollow shaft portion 41 being further rotatably supported on the casing by means of a bearing 43. The hollow shaft portion 41A is integral with (or bears) the sun gear 40D of the differential planetary gear set 40. The main shaft 34 extends throughout the hollow center of the sun gear 35A of the shift planetary gear set 35. A locking/unlocking mechanism (changeover sleeve 42) for the differential operation is disposed between the ring gear 40A of the differential planetary gear unit 40 and its carrier 40B. The ring gear 35D of the shift planetary gear set 35 is blocked by the casing. The support of the differential planetary gear set 40 is accomplished on the main shaft 34 by the connecting member 35E and the ring gear 40A connected thereto.

The operation of the above-described transmission changeover mechanism of the four-wheel drive apparatus in each changeover range will now be described.

In the ordinary four-wheel drive range, rotating force is transferred directly from the input shaft 31 to the main output shaft 34, and ordinary four-wheel drive (4H) is established, by sliding the sleeve 36A of the shift changeover unit 36 rightward in FIG. 7 to couple the gear 36B and the gear 34A, while the gear 36B remains in mesh with the gear 31A.

The rotating force transferred to the main output shaft 34 is transmitted to the differential 40 via the connecting member 35E and differential planetary ring gear 40A, and the rotating force is distributed to (divided into) the side of the rear-wheel output shaft 41 and the side of the drive sprocket 16 (the side of the front-wheel, output shaft 15) at a predetermined distribution ratio in the differential 40, thereby rotatively driving the front and rear wheels.

In four-wheel low-speed drive (4L), the gear 36C and the gear 35B are meshed, thereby coupling the input shaft 31 and the planetary sun gear 35A, by sliding the shift sleeve 36A leftward in FIG. 7 from the neutral state illustrated. Accordingly, the rotating force from the input shaft 31 is transmitted from the shift planetary sun gear 35A to the shift planetary carrier 35C via the shift sleeve 36A. The rotational speed is decelerated by the carrier 35C and then the speed-reduced rotating force is transferred to the differential planetary ring gear 40A. As set forth above, the rotating force is distributed to the front and rear wheels by the differential unit 40 to establish four-wheel low-speed drive (4L).

In FIG. 7, numeral 42 denotes a changeover sleeve for locking and unlocking the differential unit. When the changeover sleeve 42 is slid rightward from the illustrated position (neutral) in FIG. 7, the differential planetary ring gear 40A and the differential planetary carrier 40B are locked.

Figure 9:
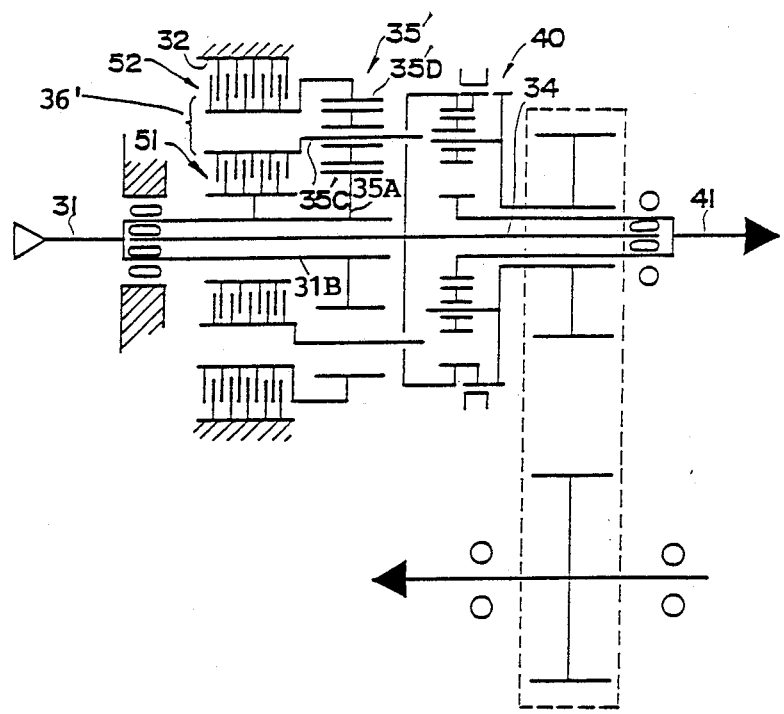
FIG. 9 is a skeleton view illustrating another embodiment of a full-time four-wheel drive apparatus according to the present invention (second and third aspects)

FIG. 9 illustrates another embodiment of a full-time rear-wheel drive apparatus according to the present invention. Whereas the shift changeover unit in the first embodiment relies upon changeover performed by the sleeve, this embodiment employs a shift changeover unit 36' comprising multiple-disk clutches.

More specifically, a multiple-disk clutch 51 is arranged between the input shaft 31 and a shift planetary carrier 35' C, and a multiple-disk clutch 52 is arranged between the casing 32 and a shift planetary ring gear 35'D (which is not blocked by the casing). The sun gear 35A is connected to the extension of the hollow portion 31B of the input shaft 31. Other portions of this embodiment are similar to those of the first embodiment and are designated by like reference characters.

This changeover unit 36' is such that by engaging the multiple-disk clutch 51 and releasing the multiple-disk clutch 52, the rotating force of the input shaft 31 is transmitted to the differential unit 40 without a speed reduction by the planetary gear set 35', thereby establishing the four-wheel drive mode 4H. On the other hand, by releasing the multiple-disk clutch 51 and engaging the multiple-disk clutch 52, the rotating force of the input shaft 31 is transmitted to the differential unit 40 following speed reduction performed by the planetary gear set 35', thereby establishing four-wheel low-speed drive (4L).

Figure 1:
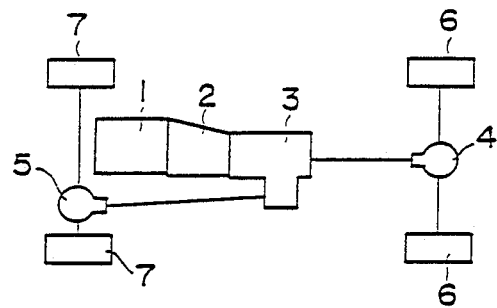
FIG. 1 is a view illustrating an arrangement of a conventional four-wheel drive apparatus.
Figure 5:
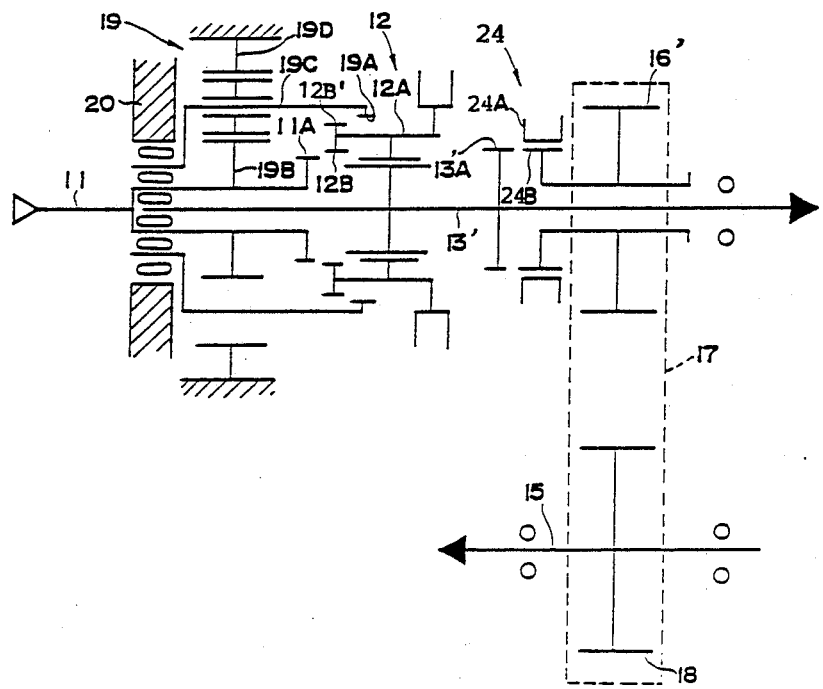
FIG. 5 is a skeleton view illustrating a conventional part-time four-wheel drive apparatus.
Figure 2:
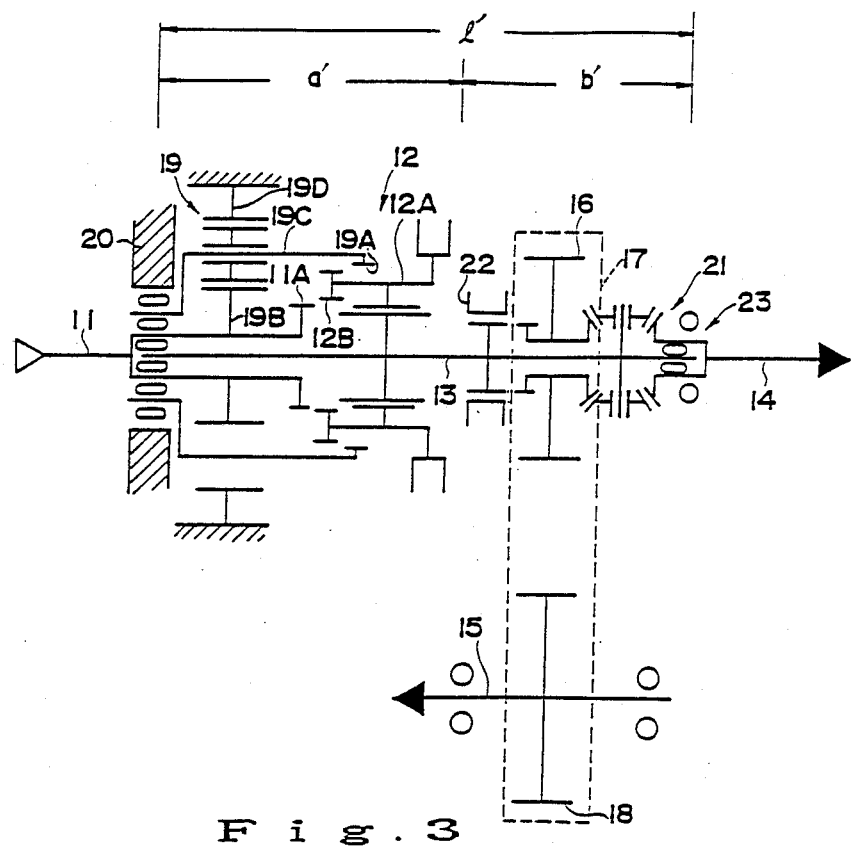
FIG. 2 is a skeleton view illustrating a conventional full-time four-wheel drive apparatus.
Figure 3:
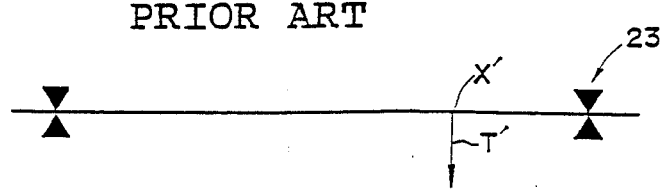
FIG. 3 is a view showing the location at which the tensioning force of a chain acts in the conventional apparatus.
Figure 4:
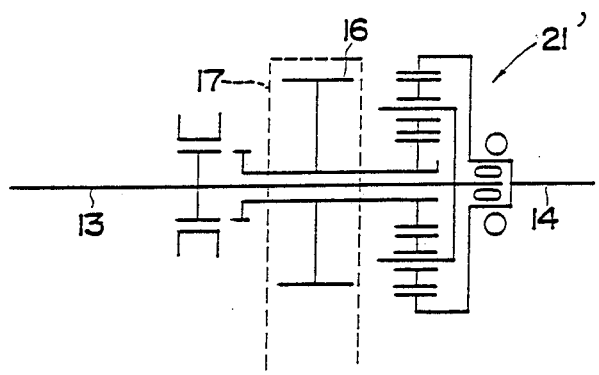
FIG. 4 is a skeleton view illustrating a differential unit of a planetary gear type in another conventional full-time four-wheel drive apparatus.
Figure 6:
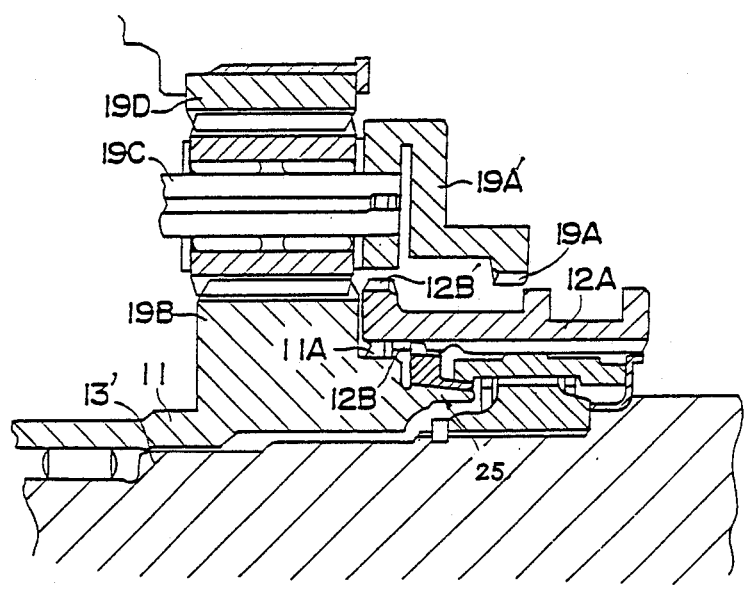
FIG. 6 is an axial cross-section illustrating a synchronizer mechanism in the conventional apparatus.
Figure 8:
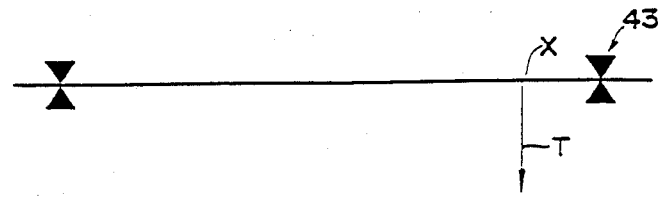
FIG. 8 is a view showing the location at which the tensioning force of a chain acts in the embodiment of FIG. 7.

As shown in FIG. 7, the axial length l of each four-wheel drive apparatus of the invention described above is reduced by the length of a section c common to both the shift section a and the differential section b (i.e. $l=a+b-c$). In the prior-art four-wheel drive apparatus, the axial length l' is equal to the sum of the shift section a' and differential sect b' ($l=a'+b'$), as shown in FIG. 2. Thus, since there is no portion common to both the shift and differential sections, the axial length of the prior is greater than that of the present invention Furthermore, as shown in FIG. 8, the position X which receives the load of the tensioning force T produced by chain 17 in each four-wheel drive apparatus of the invention is closer to the bearing 43 than is the position X' of the prior art shown in FIG. 3. As a result, there is less shaft flexure produced by the chain drive.

Figure 10:
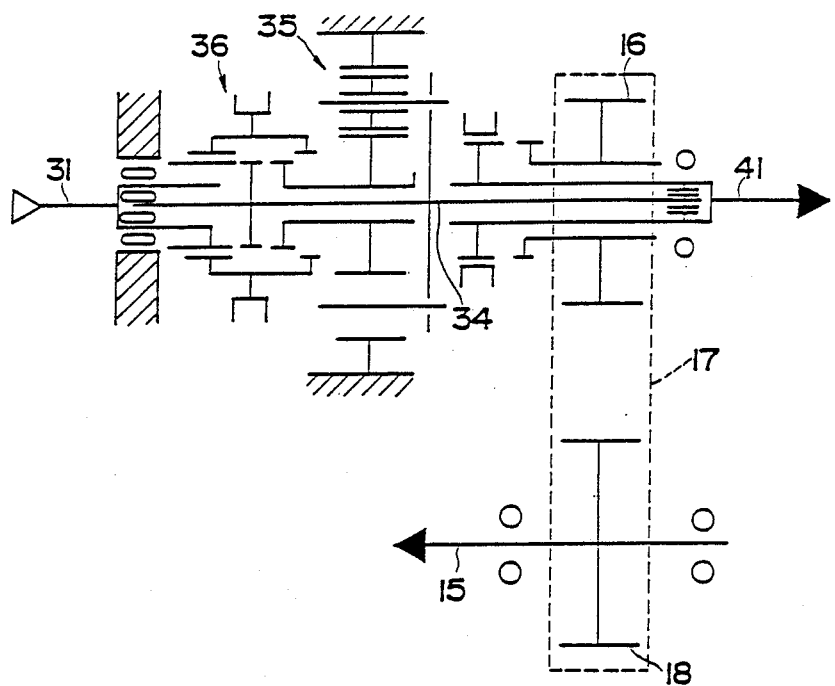
FIG. 10 is a skeleton view illustrating an application of the present invention.
Figure 11:
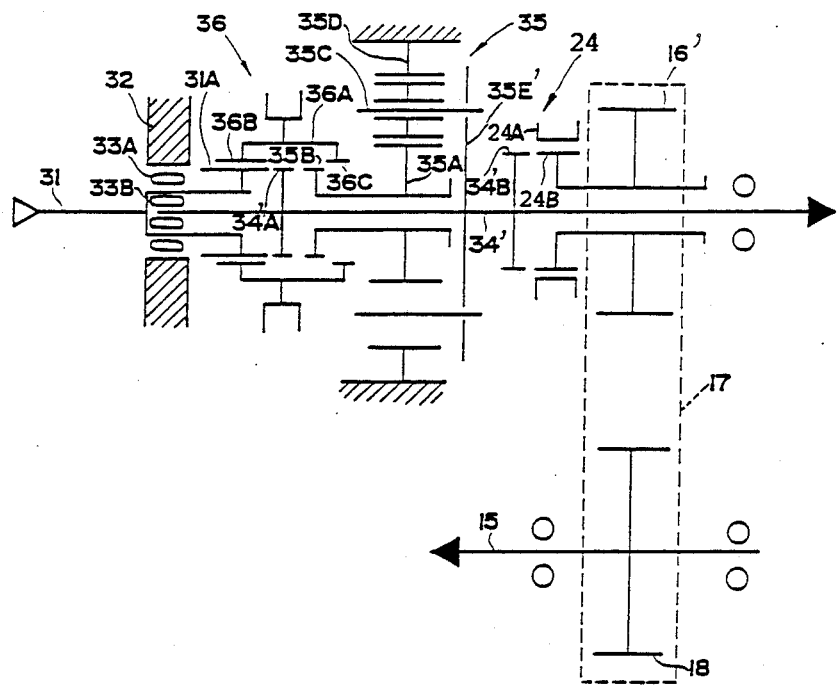
FIG. 11 is a skeleton view illustrating an embodiment of a part-time four-wheel drive apparatus according to the present invention (second and third aspects)

By taking out the differential unit 40, the full-time four-wheel drive apparatus according to the invention described hereinabove can readily be modified into a part-time four-wheel drive apparatus devoid of the differential operation, as shown in FIGS. 10 or 11. The apparatus of the invention is advantageous in that there are many components common to both the full-time arrangement and part-time arrangement.

Figure 12:
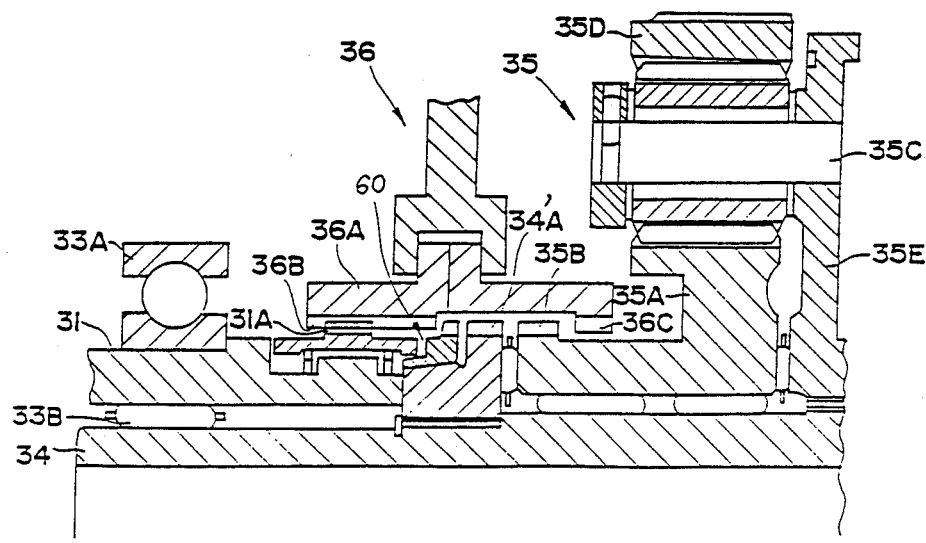
FIG. 12 is an axial cross-section illustrating a synchronizer mechanism in the embodiment of FIG. 11.

FIGS. 11 and 12 illustrate an embodiment of a part-time four-wheel drive apparatus according to the present invention. As in the full-time four-wheel drive apparatus shown in FIG. 7, the input shaft 31 is freely rotatably supported on the casing 32 by the bearing 33A. The front end (i.e. the end on the front-wheel side) of a rear-wheel output shaft 34' is freely rotatably supported in the hollow portion of the input shaft 31 by the bearing 33B.

The shift changeover unit 36 having the shift sleeve 36A is arranged between the portion where the output shaft 34' is supported on the input shaft 31 and the planetary gear set 35. When the shift sleeve 36A is slid rightward in FIG. 11 from the neutral state, which is the state illustrated, the gear 31A of the input shaft 31 and a gear 34'A of the output shaft 34' are coupled via the gear 36B of the sleeve 36A. When the shift sleeve 36A is slid leftward in FIG. 11 from the neutral state, the gear 36C of the sleeve 36A is meshed with the gear 35B of planetary sun gear 35A, whereby the input shaft 31 and planetary sun gear 35A are coupled via the sleeve 36A.

The shift planetary carrier 35C is coupled directly to the rear-wheel output shaft 34' and the ring gear 35D is blocked by the casing, so that the rotating force of the planetary sun gear 35A is transferred to the rear-wheel output shaft 34' via a connecting portion 35'E. The main shaft 34' extends throughout the center of the members of the apparatus.

The power transfer mechanism between the 2-4 changeover unit 24 and the rear-wheel output shaft 34' and front-wheel output shaft 15 is similar to that of the prior art, and portions similar to those in the prior art are designated by like reference characters.

The operation of the above-described transmission changeover mechanism of the two-wheel drive apparatus in each changeover range will now be described.

In the two-wheel (2H) drive range, rotating force is transferred directly from the input shaft 31 to the rear wheel output shaft 34', and two-wheel drive is established, by sliding the sleeve 36A of the shift changeover unit 36 rightward in FIG. 11 to couple the gear 36B and the gear 34'A by a synchronizer 60.

In the ordinary four-wheel drive mode (4H), the gear 34'B of the output shaft 34' and the gear 24B are coupled by sliding the 2-4 shift sleeve 24A leftward in FIG. 11 from the abovementioned two-wheel drive mode (2H), as inzation prior art, so that the rotating force of the rear-wheel output shaft 34' is transmitted to the front-wheel output shaft 15 via the drive sprocket 16', chain 17 and follower sprocket 18, thereby establishing the four-wheel drive mode (4H).

In four-wheel low-speed drive (4L), the gear 36C and the gear 35B are meshed, thereby coupling the input shaft 31 and the planetary sun gear 35A, by sliding the shift sleeve 36A leftward from the neutral, with the 2-4 shift sleeve 24A being situated in the four-wheel drive position, as mentioned above. Accordingly, the rotating force from the input shaft 31 is transmitted from the planetary sun gear 35A to the planetary carrier 35C via the shift sleeve 36A. The rotation is decelerated by the carrier 35C and then the rotating force is transferred to the rear-wheel output shaft 34' via the connecting portion 35E', thereby establishing four-wheel low-speed drive (4L).

In the neutral (N) range, the gears 36B and 36C of the shift sleeve 36A are not meshing with the output shaft 34' and planetary sun gear 35A, as shown in FIG. 11. Accordingly, there is no transfer of rotating force from the input shaft 31.

Figure 13:
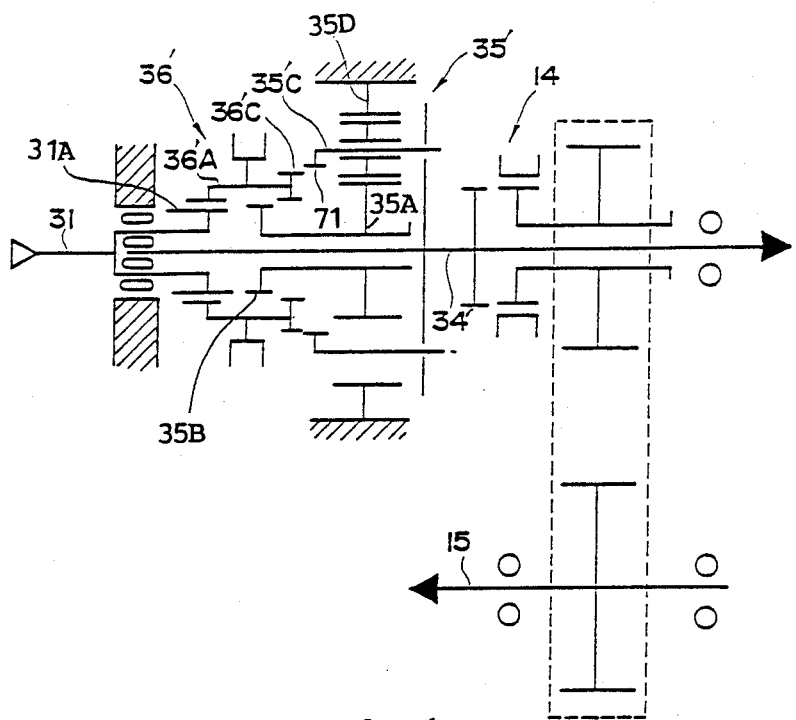
FIG. 13 is a skeleton view illustrating another embodiment of a part-time four-wheel drive apparatus according to the present invention.
Figure 14:
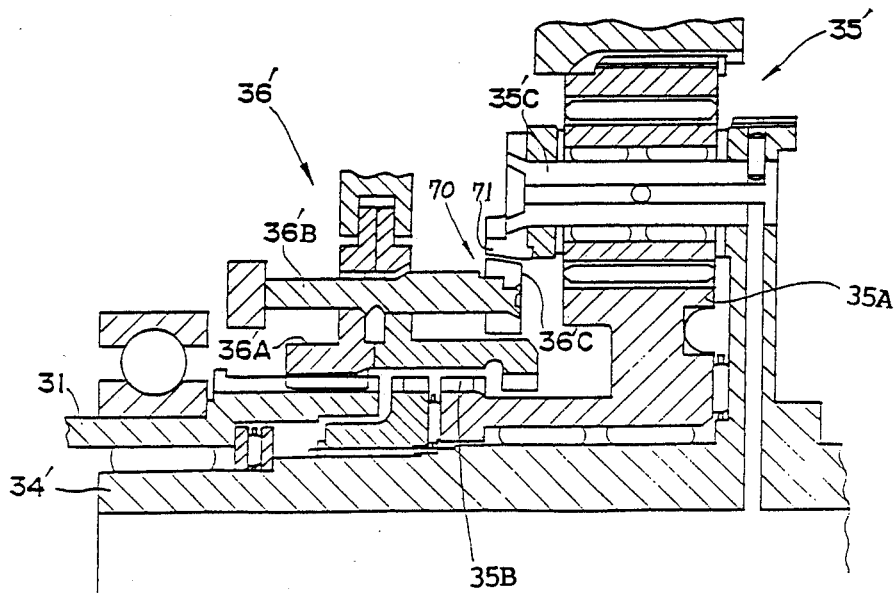
FIG. 14 is a side section illustrating a synchronizer mechanism in the embodiment of FIG. 13.

FIGS. 13 and 14 illustrate another embodiment of a part-time four-wheel drive apparatus according to the present invention. The embodiment shown in FIGS. 11 and 12 represents a synchronizer mechanism of the so-called Warner type. In the Warner-type arrangement, the gear 34'A, which is for directly coupling the input shaft and rear-wheel output shaft upon engagement of the shift sleeve in the two-wheel drive (2H) range and four-wheel drive (4H) range, is attached directly to the rear-wheel output shaft, and the synchronizer section is arranged between the shift sleeve and the output shaft. On the other hand, the synchronizer mechanism of the present embodiment is of the so-called pin type, in which a gear 71 for directly coupling the input shaft 31 and rear-wheel output shaft 34' is attached to a planetary carrier 35'C. By sliding a shift sleeve 36'A rightward in FIG. 13 from the neutral state, which is that illustrated, when the (2H) or (4H) mode is selected, a gear 36'C of the shift sleeve 36'A engages the gear 71, the shift sleeve 36'A being in mesh with the gear 31A of the input shaft 31, thereby coupling the input shaft 31 to the rear-wheel output shaft 34' via the planetary carrier 35'C to establish two-wheel drive (2H) or four-wheel drive (4H).

A synchronizer section 70 is disposed between a pin 36'B, which is attached to the shift sleeve 36'A, and the planetary carrier 35'C.

Other portions of this embodiment are similar to those shown in FIG. 11 and are designated by like reference characters.

In the embodiments of FIGS. 7 and 11 through 14, the spline (or gear) in the sleeve does not have a limitation imposed thereon by the synchronizer section. As a result, the sleeve diameter can be reduced so that the sleeve can be made to slip into the sun gear of the planetary gear unit. This makes it possible to shorten the four-wheel drive apparatus in the axial direction and lighten the weight thereof.

Furthermore, in each of the foregoing embodiments, the sun gear of shift planetary gear unit is not integrated with the input shaft, contrary to the case in the prior art. Therefore, since the sun gear is free in the high-speed state (2H or 4H), a small synchronizer capacity will suffice when a shift is made.

As many apparently widely different embodiments of the present invention can be made without departing from the spirit and scope thereof, it is to be understood that the invention is not limited to the specific embodiments thereof except as defined in the appended claims.

What is claimed is:

1. A four-wheel drive apparatus comprising a planetary gear unit for shifting, a shift changeover unit, a differential planetary gear unit and a transfer unit for transferring rotating power from one of a rear-wheel slide and a front-wheel side to the other,
    wherein said shift changeover unit is arranged on a side of said planetary gear unit directed to an input shaft of the four-wheel drive apparatus, a carrier of said planetary gear unit is connected to a main output shaft, said differential planetary gear unit is arranged between said planetary gear unit and said transfer unit, the differential planetary gear unit includes a differential planetary ring gear coupled directly to said carrier of the planetary gear unit, a differential planetary carrier coupled directly to drive means of said transfer unit and e differential planetary sun gear coupled directly to an output shaft, and a rotating force outputted by said planetary gear unit is transferred to said rear-wheel side and said front-wheel side.

2. The four-wheel drive apparatus according to claim 1, wherein said shift changeover unit includes a shift sleeve meshing at all times with a gear integral with the input shaft, said shift sleeve being meshed with a gear integral with the output shaft or a gear integral with a sun gear of said planetary gear unit when slid in an axial direction.

3. The four-wheel drive apparatus according to claim 2, wherein said shift sleeve is capable of assuming a neutral position in which it meshes with neither the gear integral with the output shaft nor the gear integral with the sun gear of said planetary gear unit.

4. The four-wheel drive apparatus according to claim 2, wherein said shift changeover unit is changed over to a high-speed side when said shift sleeve is meshed with the gear planetary carrier and the planetary ring gear in such a manner that the planetary carrier and planetary ring gear rotate in unison integral with said output shaft, and a low-speed side when said shift sleeve is meshed with the gear integral with the sun gear of said planetary gear unit.

5. The four-wheel drive apparatus according to claim 1, wherein a sun gear of said planetary gear unit is integrally coupled with the input shaft, and said shift changeover unit includes a first clutch attached between the input shaft and the planetary carrier of said planetary gear unit, and a second clutch attached between a casing of the apparatus and a ring gear of said planetary gear unit.

6. The four-wheel drive apparatus according to claim 5, wherein said first and second clutches each comprise a multiple-disk clutch.

7. The four-wheel drive apparatus according to claim 5, wherein said shift changeover unit is changed over to a high-speed side when said first clutch is engaged and said second clutch is disengaged, and to a low-speed side when said first clutch is disengaged and said second clutch is engaged.

8. The four-wheel drive apparatus according to claim 1, wherein said differential unit comprises a double pinion-type planetary gear unit having a differential unit planetary ring gear coupled with the planetary carrier of said planetary gear unit for shifting so as to rotate in unison therewith.

9. The four-wheel drive apparatus according to claim 8, wherein said planetary carrier of said differential unit is coupled with the transfer unit, and said differential unit includes a differential lock/unlock changeover sleeve for coupling the planetary carrier and the planetary ring gear in such a manner that the planetary carrier and planetary ring gear rotate in unison.

10. The four-wheel drive apparatus according to claim 9, wherein said differential changeover sleeve includes a neutral position.

11. A four-wheel drive apparatus comprising a planetary gear unit for shifting, a shift changeover unit, a differential planetary gear unit and a transfer unit for transferring rotating power from one of a rear-wheel side and a front-wheel side to the other,
    wherein said shift changeover unit is arranged on a side of said planetary gear unit directed to an input shaft of the four-wheel drive apparatus, a carrier of said planetary gear unit is connected to a main output shaft, said differential planetary gear unit is arranged between said planetary gear unit and said transfer unit, and
    said differential unit comprises a double pinion-type planetary gear unit having a differential unit planetary ring gear coupled with the planetary carrier of said planetary gear unit for shifting so as to rotate in unison therewith and a differential planetary carrier coupled directly to drive means of said transfer unit, and a rotating force outputted by said planetary gear unit is transferred to said rear-wheel side and said front-wheel side.

12. The four-wheel drive apparatus according to claim 11, wherein said planetary carrier of said differential planetary gear unit is coupled with the transfer unit, and said differential planetary gear unit includes a differential lock/unlock changeover sleeve for coupling the planetary carrier and the planetary ring gear in such a manner that the planetary carrier and planetary ring gear rotate in unison.

13. The four-wheel drive apparatus according to claim 12, wherein said differential changeover sleeve includes a neutral position.

* * * * *